United States Patent [19]

Sekiya

[11] Patent Number: 5,146,900
[45] Date of Patent: Sep. 15, 1992

[54] APPARATUS FOR TREATING EXHAUST PARTICULATES RESULTING FROM COMBUSTION IN DIESEL ENGINE

[75] Inventor: Yoshiki Sekiya, Yokohama City, Japan

[73] Assignee: Nissan Motor Co., Ltd., Yokohama City, Japan

[21] Appl. No.: 536,105

[22] Filed: Jun. 11, 1990

[30] Foreign Application Priority Data

Jun. 12, 1989 [JP] Japan .................... 1-146579

[51] Int. Cl.$^5$ .................... F01N 3/02; F02M 37/04
[52] U.S. Cl. .................... 123/501; 60/274
[58] Field of Search .................... 60/274; 123/500, 501, 123/502

[56] References Cited

U.S. PATENT DOCUMENTS

| | | | |
|---|---|---|---|
| 4,209,981 | 7/1980 | Miyamori | 60/274 |
| 4,452,040 | 6/1984 | Kobashi | 60/274 |
| 4,479,473 | 10/1984 | Wade | 123/501 |
| 4,603,550 | 8/1986 | Shinzawa | 60/274 |
| 4,685,290 | 8/1987 | Kamiya | 60/274 |
| 4,756,292 | 7/1988 | Mischke | 123/501 |
| 4,831,838 | 5/1989 | Nagai | 60/274 |
| 4,854,123 | 8/1989 | Inoue | 60/274 |

FOREIGN PATENT DOCUMENTS

| | | |
|---|---|---|
| 0158887 | 10/1985 | European Pat. Off. . |
| 59-194020 | 11/1984 | Japan . |
| 60-022014 | 2/1985 | Japan . |
| 61-197710 | 9/1986 | Japan . |

OTHER PUBLICATIONS

Jörg Abthoff et al., *SAE Technical Paper Series* 850015, "The Regenerable Trap Oxidizer—An Emission Control Technique For Diesel Engines", pp. 75–85 (date unknown).

*Primary Examiner*—Carl S. Miller
*Attorney, Agent, or Firm*—Foley & Lardner

[57] ABSTRACT

In an apparatus for treating exhaust particulates in a diesel engine, a basal fuel injection timing is determined based on an engine operating condition. When the engine operating condition falls in a predetermined operating range, the basal fuel injection timing is corrected, and operation of a fuel injection pump is modified.

9 Claims, 11 Drawing Sheets

APPARATUS FOR TREATING EXHAUST PARTICULATES RESULTING FROM COMBUSTION IN DIESEL ENGINE

BACKGROUND OF THE INVENTION

The present invention relates to an apparatus for treating exhaust particulates resulting from combustion in a diesel engine.

Various types of apparatus for treating exhaust particulates in a diesel engine have been previously proposed. One of such known apparatus is shown in FIGS. 14 and 15 (refer to S. A. E. paper 850015).

As shown in FIG. 14, a turbine rotor of an exhaust turbo supercharger 2 is installed within an exhaust passage 1. For collecting exhaust particulates in exhaust gas, a trap 3 coated with catalyser is installed within the exhaust passage upstream of the turbine rotor. As shown in FIG. 15, the trap 3 includes passages 3B which extend approximately in parallel to an exhaust gas flow and are defined between porous members constructed to form a honeycomb shaped grid 3A. The passages 3B have inlets or outlets sealed by a seal members 3C as shown in FIG. 15.

The exhaust particulates which are collected on the trap 3 are afterburned when an exhaust gas temperature exceeds a range from 350° C. to 400° C. owing to the catalytic action.

A problem encountered in such known apparatus is that, since continuous low speed with low load operation results in insufficient increase in the exhaust gas temperature, the exhaust particulates collected on the trap 3 cannot be afterburned, causing an occurrence of a clogging of the trap 3 due to accumulation of the exhaust particulates. to accumulation of the exhaust particulates.

Another problem encountered is that, when the exhaust gas temperature increases to cause simultaneous afterburning of a large amount of the accumulated exhaust particulates, a temperature of the trap 3 increases to such a degree as to cause the trap 3 to melt down and become deteriorated.

SUMMARY OF THE INVENTION

It is, therefore, an object of the present invention to provide an appratus for treating exhaust particulates for a diesel engine with which the trap 3 with catalyser is prevented from clogging due to accumulation of the exhaust particulates and release of the same in the atmosphere is effectively restrained.

According to one aspect of the present invention, there is provided, in a diesel engine:

a pump arranged to carry out a fuel injection to the engine;

an exhaust passage connected to the engine;

a honeycomb catalytic converter installed within said exhaust passage, said honeycomb catalytic converter including a plurality of passages which an exhaust gas passes through;

means for detecting an engine operating condition and generating an engine operating condition indicative signal indicative of said engine operating condition detected;

means for setting a fuel injection amount based on said engine operating condition indicative signal:

means for determining a basal fuel injection timing based on said engine operating condition indicative signal and generating a basal fuel injection timing indicative signal indicative of said basal fuel injection timing determined;

means for determining whether said engine operating condition falls in a predetermined operating range or not based on said engine operating condition indicative signal;

means for correcting said basal fuel injection timing when said engine operating condition falls in said predetermined operating range and generating a fuel injection timing correcting signal indicative of said fuel injection timing corrected; and means for modifying operation of said pump based on said fuel injection timing correcting signal.

According to another aspect of the present invention, there is provided an apparatus for treating exhaust particulates in a diesel engine, comprising:

means for detecting an engine operating condition and generating an engine operating condition indicative signal indicative of said engine operating condition detected:

means for setting a fuel injection amount based on said engine operating condition indicative signal:

means for determining a basal fuel injection timing based on said engine operating condition indicative signal and generating a basal fuel injection timing indicative signal indicative of said basal fuel injection timing determined;

means for determining whether said engine operating condition falls in a predetermined operating range or not based on said engine operating condition indicative signal;

means for correcting said basal fuel injection timing when said engine operating condition falls in said predetermined operating range and generating a fuel injection timing correcting signal indicative of said fuel injection timing corrected; and means for effecting a fuel injection to the engine based on said fuel injection timing correcting signal.

According to still another aspect of the present invention, there is provided a method of treating exhaust particulates in a diesel engine, the method comprising the steps of:

detecting an engine operating condition and generating an engine operating condition indicative signal indicative of said engine operating condition dtected;

setting a fuel injection amount based on said engine operating condition indicative signal:

determining a basal fuel injection timing based on said engine operating condition indicative signal and generating a basal fuel injection timing indicative signal indicative of said basal fuel injection timing determined;

determining whether said engine operating condition falls in a predetermined operating range or not based on said engine operating condition indicative signal;

correcting said basal fuel injection timing when said engine operating condition falls in said predetermined operating range and generating a fuel injection timing correcting signal indicative of said fuel injection timing corrected; and effecting a fuel injection to the engine based on said fuel injection timing correcting signal.

DETAILED DESCRIPTION OF THE INVENTION

An embodiment of the present invention will be described with reference to FIG. 1 through FIG. 13.

Figure 1:
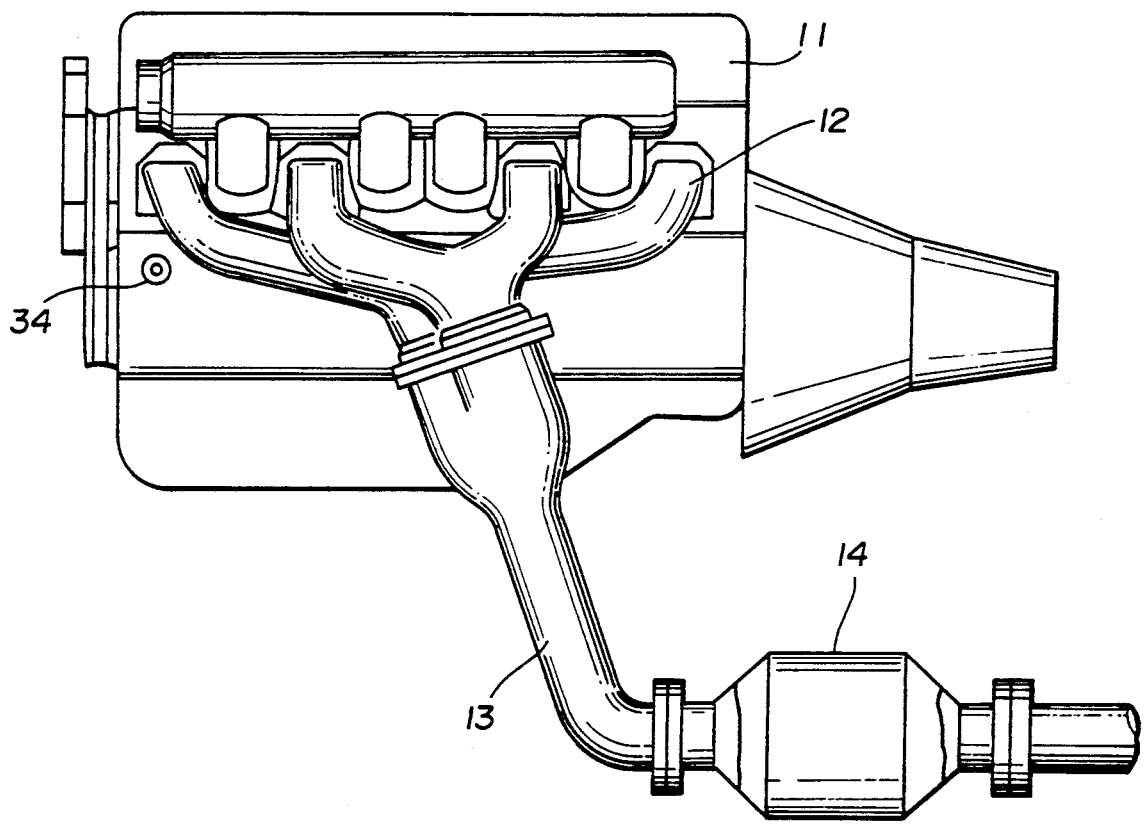
FIG. 1 is a schematic illustration showing a diesel engine with a honeycomb catalytic converter embodying the present invention.

As shown in FIG. 1, a honeycomb shaped catalytic converter 14 is installed within an exhaust passage 13 which is installed in a diesel engine 11 downstream of the aggregation portion of an exhaust manifold 12. In the honeycomb shaped catalytic converter 14, a number of passages which extend in approximately parallel to an exhaust gas flow are defined between porous members, such as a ceramic, constructed to form a honeycomb shaped grid. The honeycomb catalytic converter 14 is not similar to the conventional one in that an inlet and an outlet of each of the passages is not sealed by a seal member, and an exhaust gas passes through all the passages.

Figure 2:
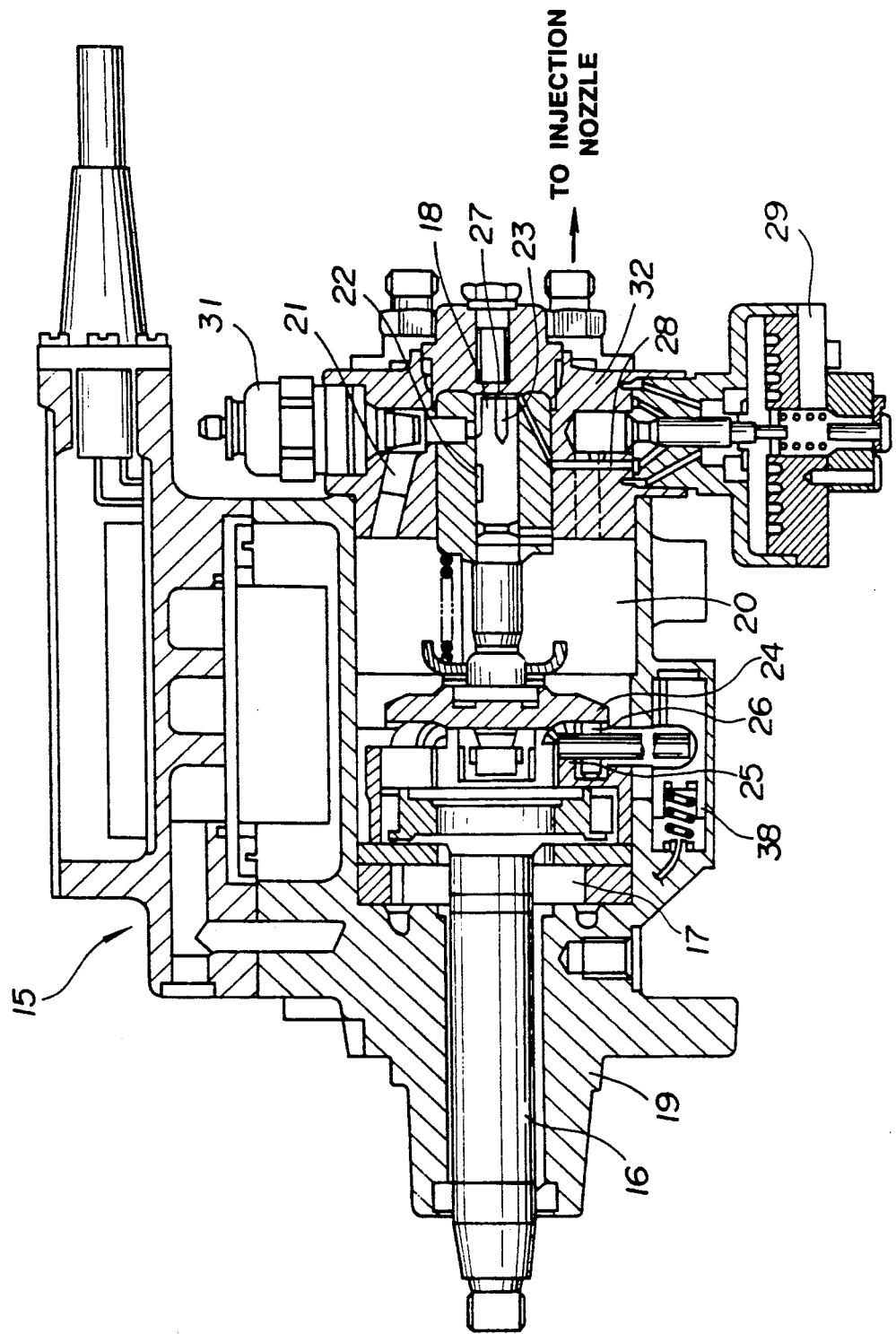
FIG. 2 is a vertical section showing an electronically controlled fuel injection pump with a timer.

The diesel engine 11 is provided with an electronically controlled fuel injection pump 15 (not seen in FIG. 1). As shown in FIG. 2, the fuel injection pump 15 includes a drive shaft 16 which is connected to an output shaft of the engine 11, and a feed pump 17 and a plunger pump 18 which are driven by the drive shaft 16. Inhaled from a fuel inlet (not shown) by means of the feed pump 17, the fuel is introduced into a pump chamber 20 within a pump housing 19, then supplied to the plunger pump 18 through a suction passage 21 which opens to the pump chamber 20.

At one end of the plunger 22 of the plunger pump 18, the same number of suction slots 23 as the number of cylinders are formed, and at the other end of the plunger 22, a face cam 24 is integrally formed also with the same number of cam grooves as the number of cylinders. The face cam 24 passes over, in rotation with the drive shaft 16, a roller 26 which is arranged to a roller ring 25, and reciprocates within a predetermined cam lift.

The plunger 22 reciprocates in rotating, so that, in accordance with this rotational and reciprocating motion, the fuel is inhaled from the suction slots 23 to - a plunger chamber 27, then supplied from a distribution port (not shown) to an injection nozzle of each cylinder through a delivery valve.

On the other hand, in order to regulate the injection timing and the fuel injection amount, a fuel passage 28 which communicates the pump chamber 20 with the plunger chamber 27 is formed, and an electromagnetic valve 29 is provided for opening and closing the fuel passage 28. The electromagnetic valve 29 is arranged for releasing the plunger chamber 27 to the pump chamber 20 when the valve 29 is open. The valve 29 is closed for a predetermined period in response to a signal from a drive circuit 30 (which will be described hereinafter) in accordance with the operating condition of the engine 11 during the exhaust stroke of the plunger pump 18. In addition, during the compression stroke of the plunger 22, the injection of fuel is started by closing the electromagnetic valve 29, and the injection of fuel is completed by opening the electromagnetic valve 29. Therefore, the fuel injection start timing is regulated by regulating the timing at which the electromagnetic valve 29 is closed, and the fuel injection amount is regulated by regulating the period in which the electromagnetic valve 29 is open. A reference numeral 31 denotes a fuel cut valve for closing the suction passage 21 when the engine 11 is at a standstill or the like, and 32 denotes a distributor head.

Figure 3:
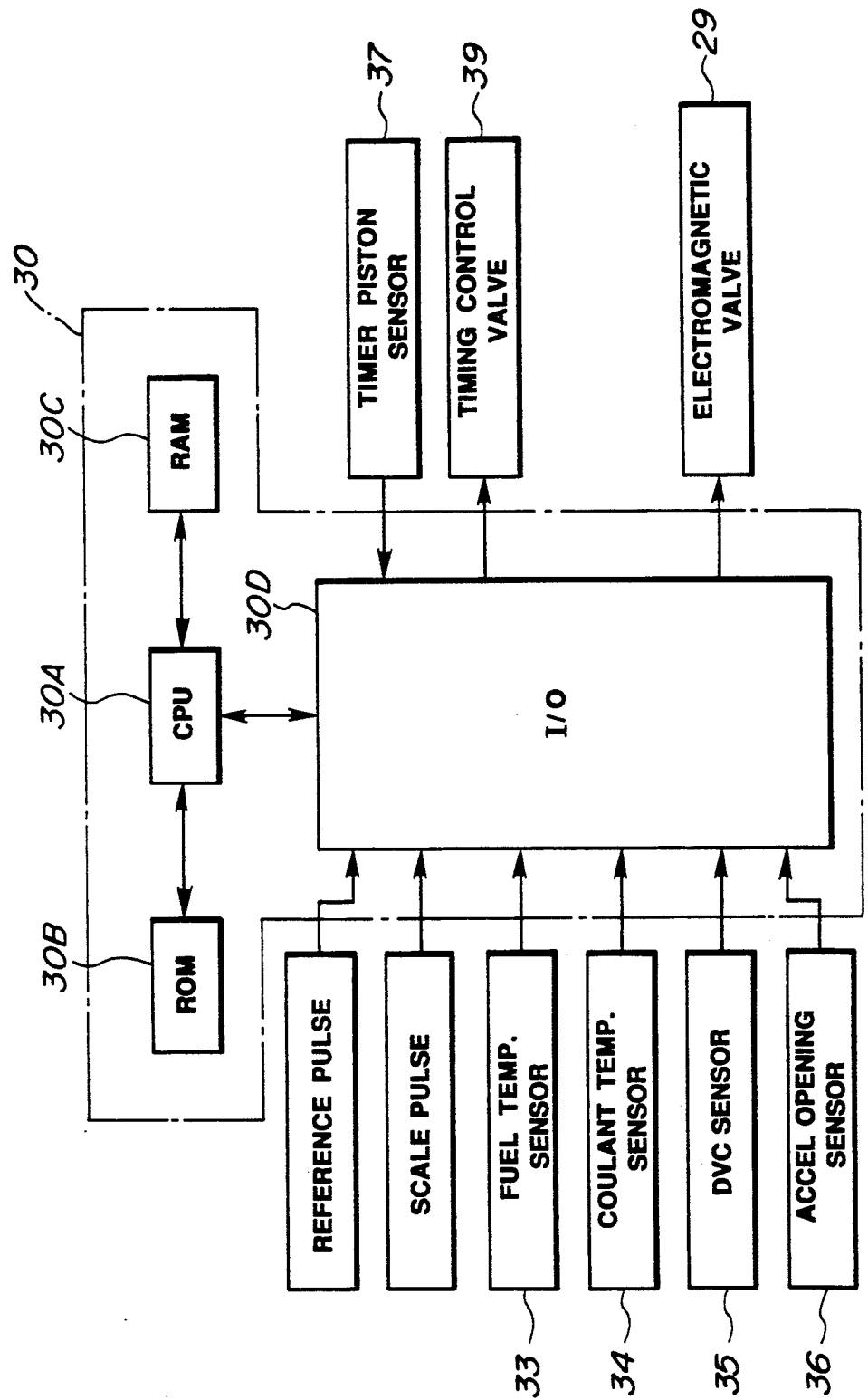
FIG. 3 is a block diagram showing a control system for the engine.

As shown in FIG. 3, the drive circuit 30 includes a central processing unit (hereinafter referred as CPU) 30A, a read only memory (hereinafter referred as ROM) 30B, a random access memory (hereinafter referred as RAM) 30C, and an input and output circuit (hereinafter referred as I/O) 30D.

Figure 4:
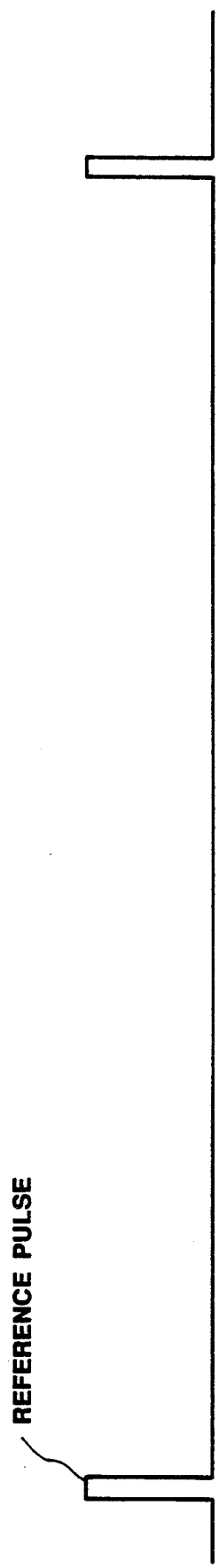
FIG. 4 is a waveform chart showing a reference pulse.
Figure 5:
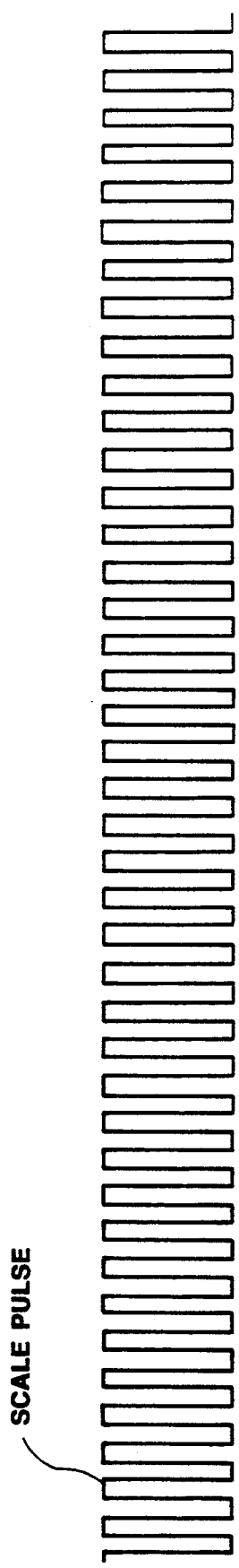
FIG. 5 is a view similar to FIG. 4, but showing a scale pulse.

Into the CPU 30A are entered through the I/O 30D one pulse of the reference pulse for every one rotation of the fuel injection pump 15 (for example, for every one rotation of the drive shaft 16) as shown in FIG. 4, and 36 pulses of the scale pulse for every one rotation of the fuel injection pump 15 as shown in FIG. 4. Also into the CPU 30A are entered a signal derived from a fuel temperature sensor 33, a signal derived from a coolant temperature sensor 34, a signal derived from a DVC sensor 35 which detects actual valve-closed timing and period of the electromagnetic valve 29, a signal derived from an accel opening degree sensor 36, a signal derived from a timer piston sensor 37 which detects an actual position of the face cam 24, and a signal derived from an engine speed sensor (not shown). In this embodiment, the accel opening degree sensor 36 and the engine speed sensor constitute operating condition detecting means.

After reading informations of the above-mentioned various signals from the I/O 30D based on a program which is stored in the ROM 30B, the CPU 30A performs processing and sets to the I/O 30D the data of the regulation amount for regulating the electromagnetic valve 29 and a timing control valve 39 for a timer 38. The timer 38, which will be described hereinafter, constitues Injection timing modifying means. The I/O 30D generates pulses based on the data to perform regulation of the electromagnetic valve 29 and the timing control valve 39. In addition, the RAM 30C is arranged for temporarily storing the data which relate to the processing of the CPU 30A.

Figure 6:
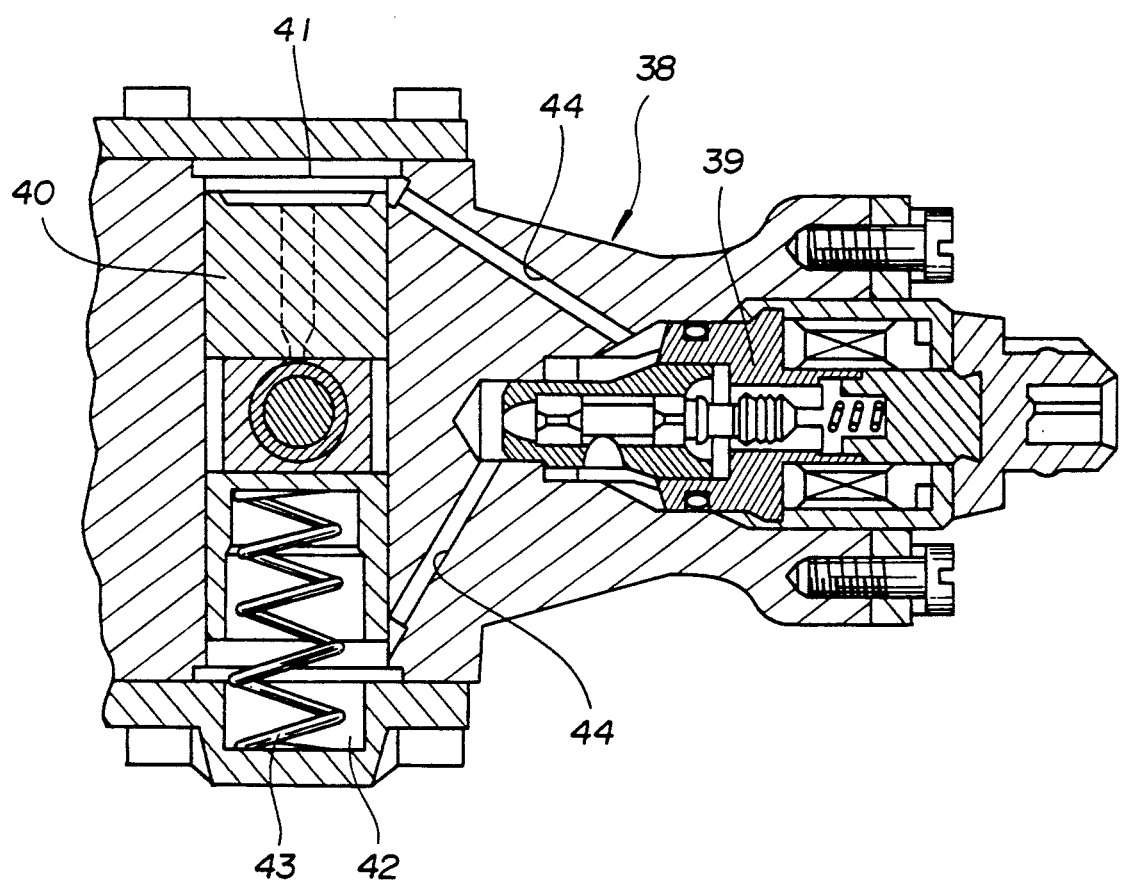
FIG. 6 is an enlarged detail of a timer of FIG. 2.

As shown in FIGS. 2 and 6, in the timer 38, a high pressure chamber 41 and a low pressure chamber 42 are defined by a timer piston 40. In the low pressure chamber 42 is installed a timer spring 43 which urges the timer piston 40 to the high pressure chamber 41. The timing control valve 39 is subjected to duty control. The fuel from the pump chamber 20 is introduced into the high pressure chamber 41 to the low pressure chamber 42 through an oil passage 44, and the position of the face cam 24 is regulated by regulating the position of the timer piston 40. Thus, the injection timing and the oil transfer rate are controlled in a variable manner.

In this embodiment, the drive circuit 30 constitutes injection amount setting means, injection timing setting means, operating range determining means, injection timing correcting means, and drive control means.

Figure 7:
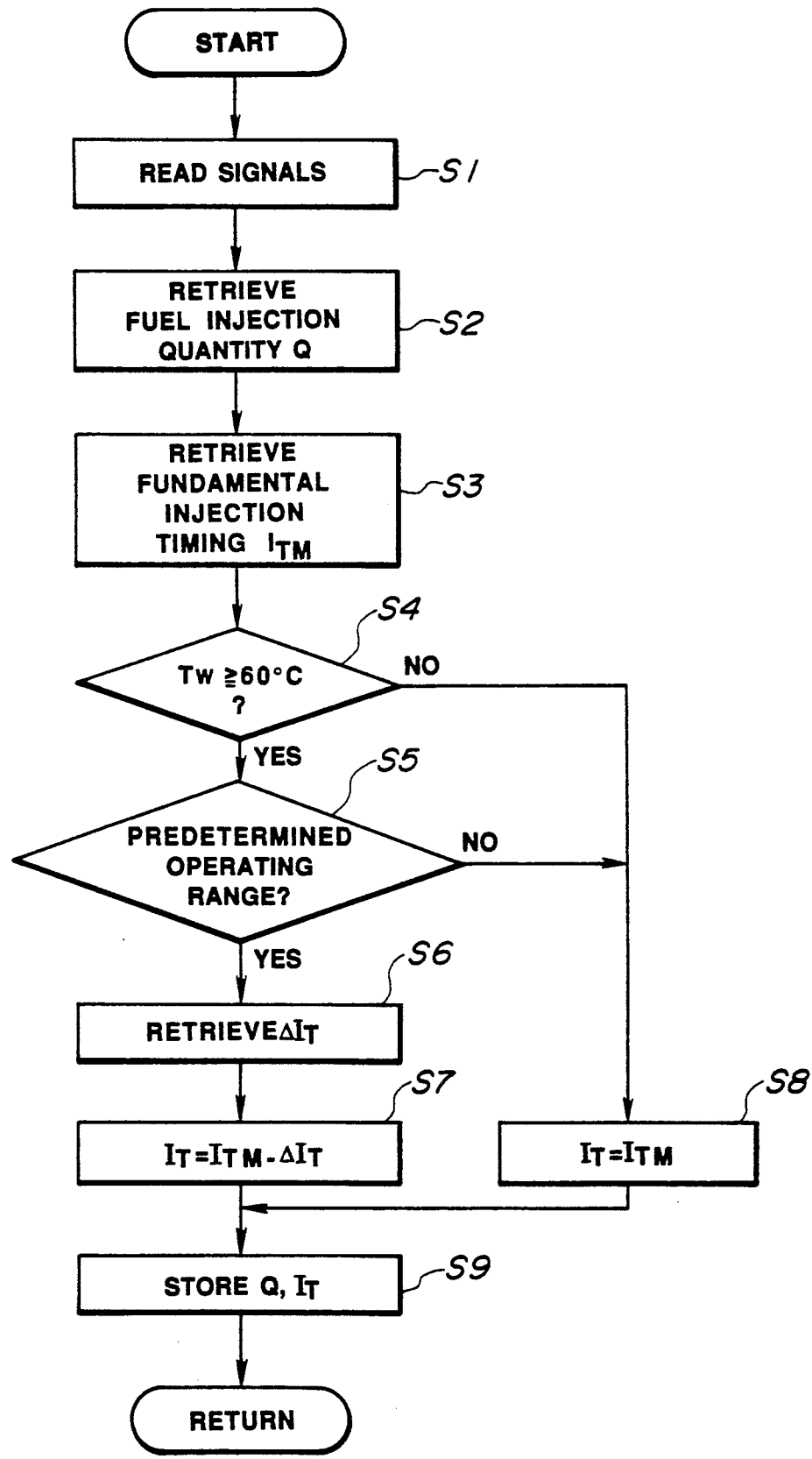
FIG. 7 is a flowchart of a basic control.

Next, the operation will be described in accordance with a flowchart of FIG. 7.

In a step S1, various signals such as an accel opening degree $V_A$, an engine speed N, a coolant temperature $T_W$, a fuel temperature $T_F$ are read in the RAM 30C.

Figure 8:
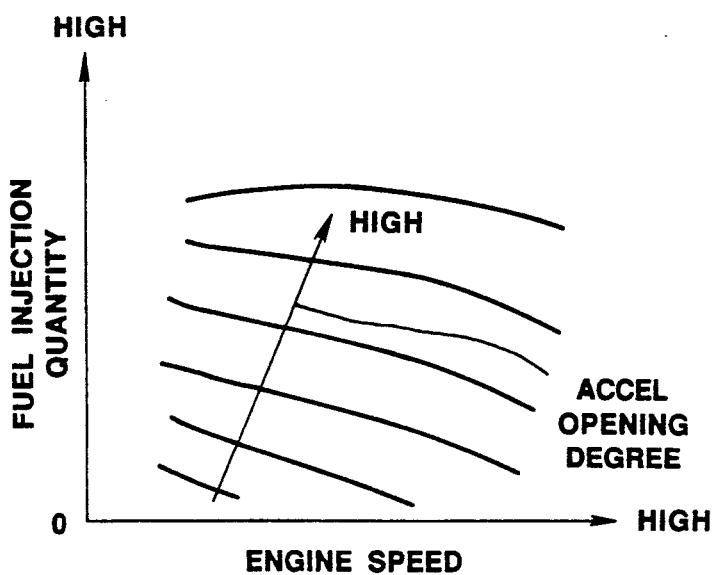
FIG. 8 is a map showing fuel injection amount vs. engine speed.

In a step S2, a fuel injection amount Q is retrieved from a map based on the accel opening degree $V_A$ and engine speed N detected. As shown in FIG. 8, the fuel injection amount Q is set in the map in connection with the accel opening degree $V_A$ and the engine speed N.

Figure 9:
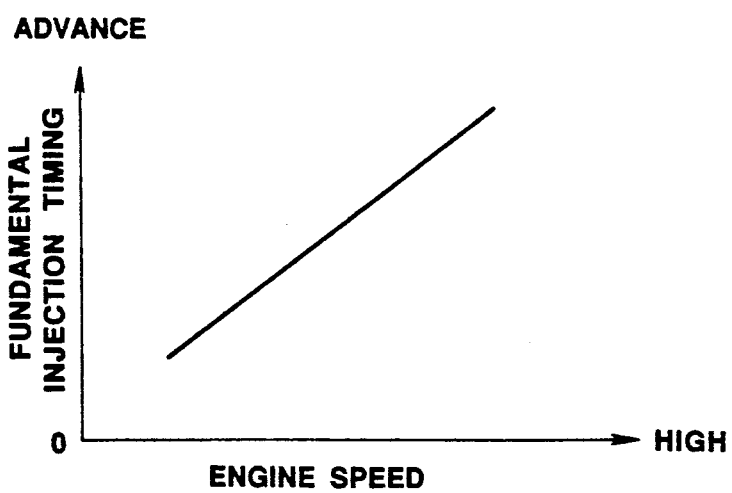
FIG. 9 is a view similar to FIG. 8, but showing basal injection timing vs. engine speed.
Figure 10:
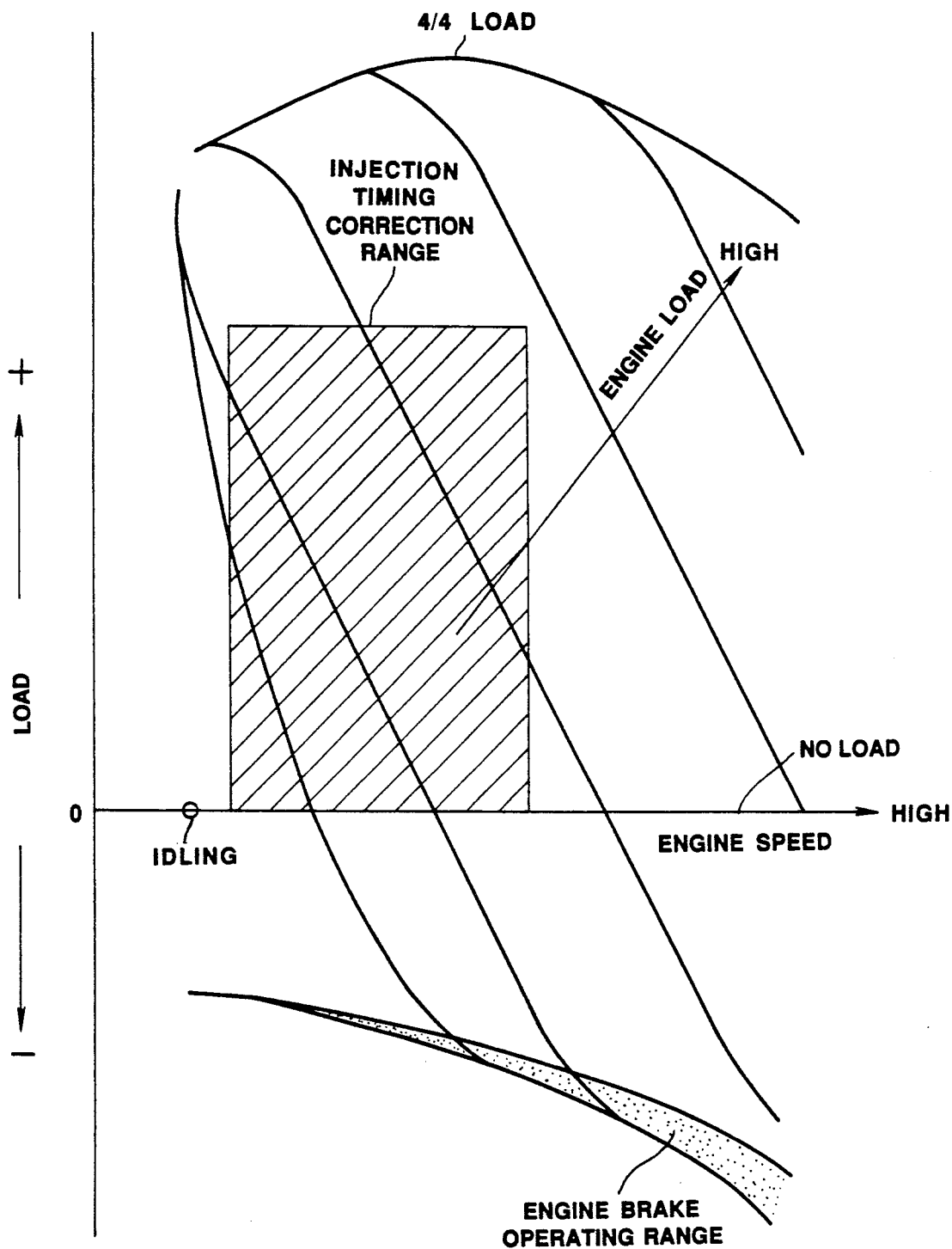
FIG. 10 is a view similar to FIG. 9, but showing engine load vs. engine speed.

In a step S3, a basal injection timing $I_{TM}$ is retrieved from a map based on the detected engine speed N. As shown in FIG. 9, the basal injection timing $I_{TM}$ is set in the map in such a way that it advances with increase in the engine speed N.

In a step S4, decision is performed whether the detected coolant temperature $T_W$ is, for example, more than or equal to 60° C. or not. If the answer is YES, the program proceeds to a step 5, whereas if the answer is NO, the program proceeds to a step 8.

In the step S5, decision is performed whether a current operating condition of the engine 11 is in a predetermined operating range or not based on the detected accel opening degree $V_A$ (engine load) and the engine speed N. If the answer is YES, the program proceeds to a step 6, whereas if the answer is NO, the program proceeds to a step 8. As indicated by a zone with oblique lines in FIG. 10, the predetermined operating range is set in connection with the engine load and the engine speed N.

Figure 11A:
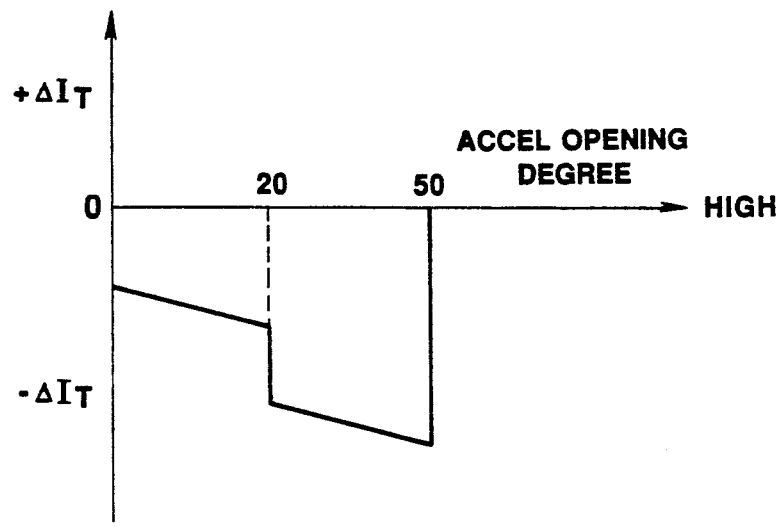
FIG. 11A is a view similar to FIG. 10, but showing injection timing correcting amount vs. accel opening degree.
Figure 11B:
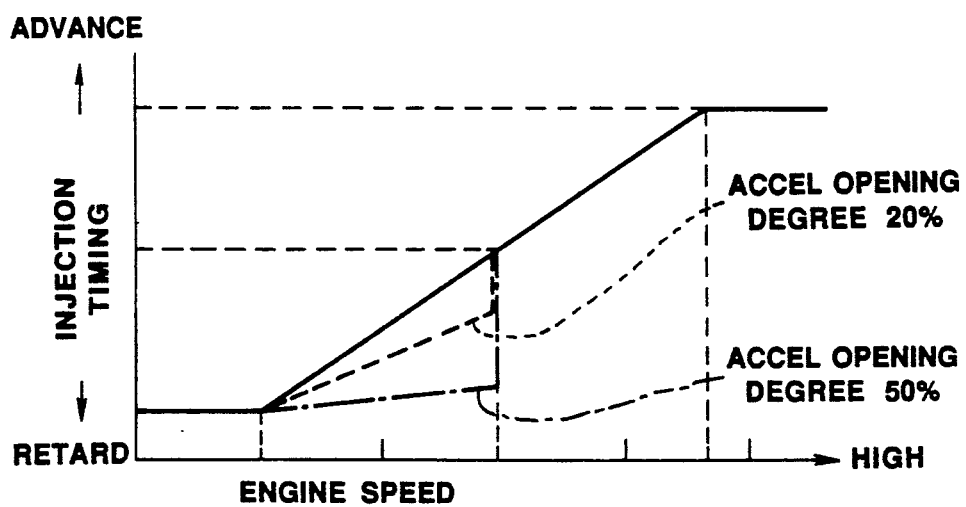
FIG. 11B is a view similar to FIG. 11A, but showing injecion timing vs. engine speed.

In the step S6, an injection timing correcting amount $\Delta I_T$ is retrieved from a map based on the accel opening degree $V_A$ and the engine speed N detected. As shown in FIG. 11A, the injection timing correcting amount $\Delta I_T$ is set for the accel opening degree $V_A$ (the engine load), for example, in such a way that a retard of the injection timing is provided when the accel opening degree VA is more than or equal to a predetermined value (for example, 50%). Alternatively, as shown in FIG. 11B, a large retard of the injection timing may be provided in accordance with increase in the accel opening degree VA in a predetermined range of the engine speed N (for example, 1000 rpm through 3000 rpm).

In a step S7, in order to provide a retard of the basal injection timing $I_{TM}$, the retrieved injection timing correcting amount $\Delta I_T$ is subtracted from the basal injection timing $I_{TM}$ which is retrieved in the step S3, thereby setting a final injection timing $I_T$.

In the step S8, the basal injection timing $I_{TM}$ which is retrieved in the step S3 is set as the final injection timing $I_T$.

In a step S9, the final injection timing $I_T$ which is set in the step S7 or S8, and the fuel injection amount Q are temporarily stored in the RAM30C.

Thus, the electromagnetic valve 29 and the timing control valve 39 are regulated based on the fuel injection amount Q and the final injection timing $I_T$, and the fuel is supplied to the injection nozzle of each cylinder.

The following effects are produced by providing a retard of the injection timing as described above.

Figure 12:
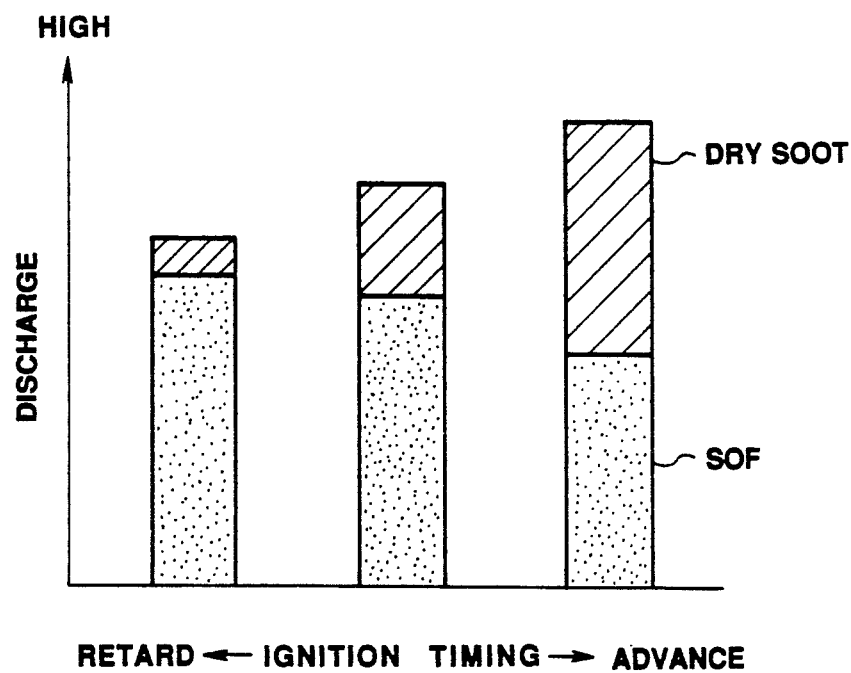
FIG. 12 is a graph showing discharge of exhaust particulates vs. injection timing.

The components of exhaust particulates are roughly classified into a carbon part (hereinafter referred as DRY SOOT) and a soluble organic part (hereinafter referred as SOF). As shown in FIG. 12, there is such a tendency that the advance of the injection timing results in increase in the discharge of DRY SOOT and in decrease in the discharge of SOF, and that a retard of the injection timing results in great decrease in the discharge of hydrocarbon (HC).

Figure 13:
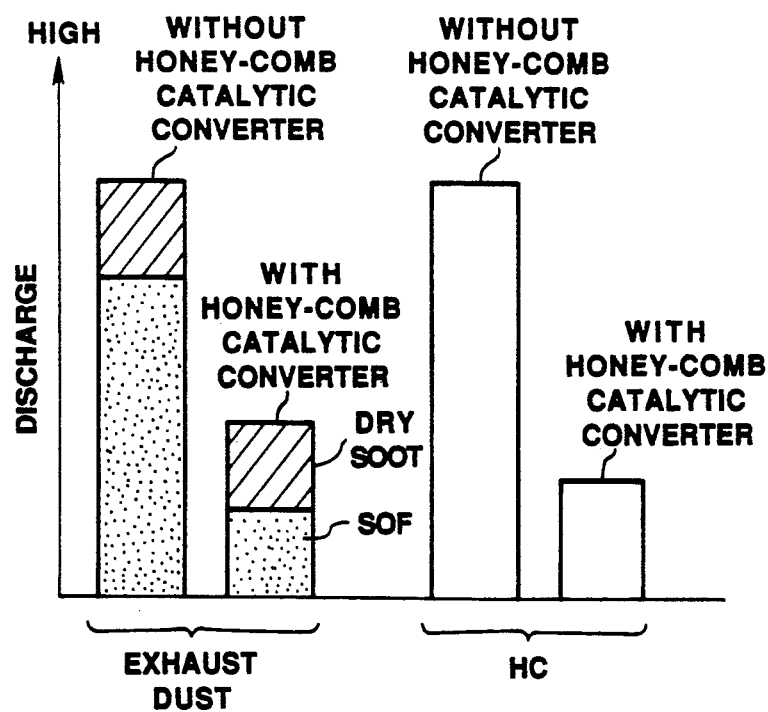
FIG. 13 is a view similar to FIG. 12, but showing discharge of exhaust particulates when a honeycomb catalytic converter is disposed within an exhaust passage, and the same when it is not disposed therewithin.
Figure 14:
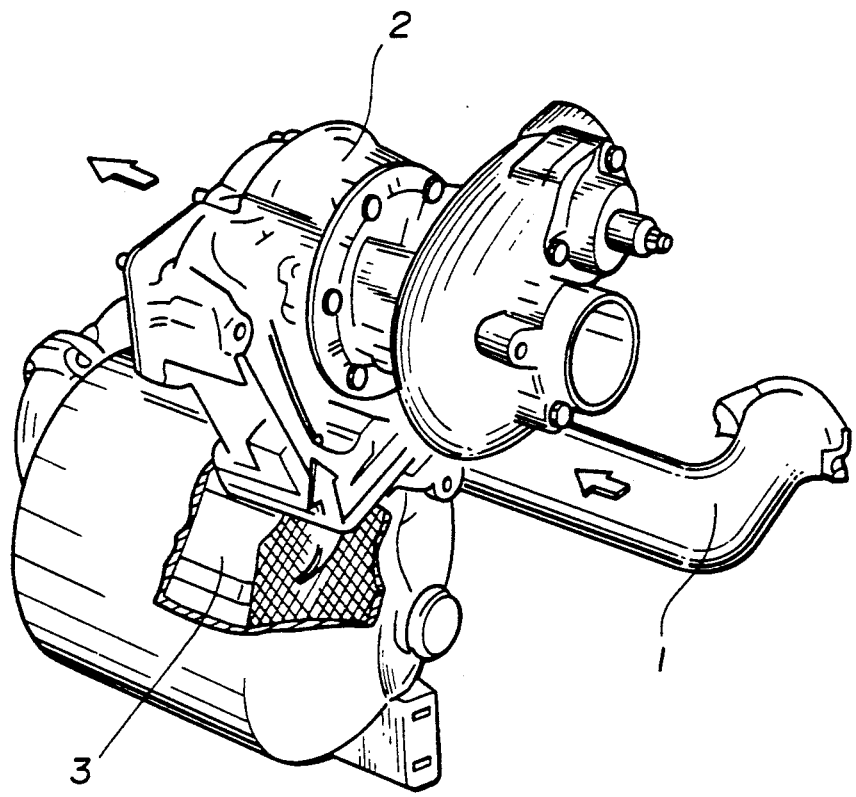
FIG. 14 is a perspective view showing a previously proposed apparatus for treating exhaust particulates in a diesel engine.
Figure 15:
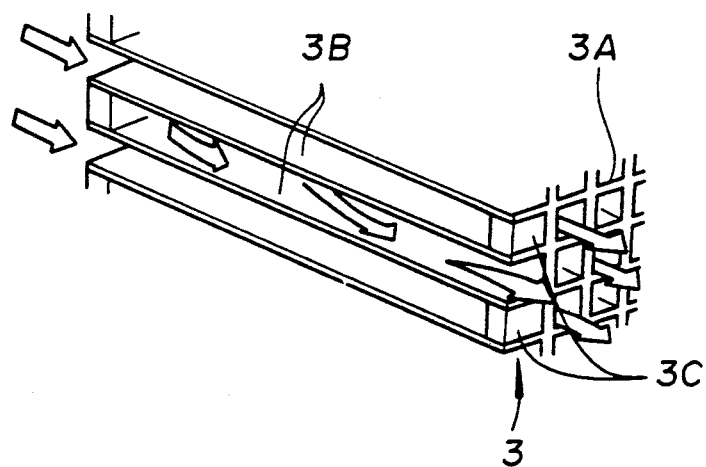
FIG. 15 is an enlarged partial perspective view showing a trap with catalyser of the apparatus in FIG. 14.

FIG. 13 is a graph showing the discharge of exhaust particulates and HC when the honeycomb catalytic converter 14 is disposed within the exhaust passage 13, and the same when it is not disposed therewithin. As shown in FIG. 13, the discharge of exhaust particulates and HC in the atmosphere greatly decreases with the honeycomb catalytic converter 14. This is due to the oxidation of the most part of SOF and the most part of HC under the catalytic action of the honeycomb catalytic converter 14.

Therefore, when a retard of the injection timing is provided to decrease the discharge of DRY SOOT and to increase the discharge of SOF, the SOF is oxidized under the catalytic action of the honeycomb catalytic converter 14. As a result, the SOF released in the atmosphere is decreased, allowing reduced discharge of exhaust particulates released in the atmosphere.

Further, since the exhaust gas passes through all the passages which are formed in the honeycomb catalytic converter 14, the honeycomb catalytic converter 14 is prevented from clogging due to accumulation of the exhaust particulates.

Still further, since a retard of the injection timing is not provided while the engine 11 undergoes a high load, a high rotational speed, and a deceleration, or when it is cold, the discharge of exhaust particulates may be reduced without deteriorating the driving performance of the engine 11.

Still further, since a retard of the injection timing reduces the discharge of nitrogen oxides ($NO_x$), the amount of recirculation of exhaust gas may be reduced when the exhaust gas recirculation is needed, resulting in reduced abrasion of the engine 11 and decreased discharge of exhaust particulates due to the exhaust recirculation.

The discharge of HC increases due to a retard of the injection timing. However, since the HC is eliminated by oxidation under the catalytic action of the honeycomb catalytic converter 14, the discharge of HC released in the atmosphere may be restrained.

What is claimed is:

1. In a diesel engine:
    a pump arranged to carry out a fuel injection to the engine;
    an exhaust passage connected to the engine;
    a honeycomb catalytic converter installed within said exhaust passage, said honeycomb catalytic converter including a plurality of passages which an exhaust gas passes through;

means for detecting an engine operating condition and generating an engine operating condition indicative signal indicative of said engine operating condition detected;

means for setting a fuel injection amount based on said engine operating condition indicative signal;

means for determining a basal fuel injection timing based on said engine operating condition indicative signal and generating a basal fuel injection timing indicative signal indicative of said basal fuel injection timing determined;

means for determining whether said engine operating condition falls in a predetermined operating range based on said engine operating condition indicative signal, said predetermined operating range defined such that 1) an engine speed is between a first predetermined low engine speed and a second predetermined low engine speed and 2) an engine load is less than a predetermined low engine load;

means for correcting said basal fuel injection timing when said engine operating condition falls in said predetermined operating range and generating a fuel injection timing correcting signal indicative of said fuel injection timing corrected; and means for modifying operation of said pump based on said fuel injection timing correcting signal.

2. An apparatus for treating exhaust particulates in a diesel engine comprising:

means for detecting an engine operating condition and generating an engine operating condition indicative signal indicative of said engine operating condition detected;

means for setting a fuel injection amount based on said engine operating condition indicative signal;

means for determining a basal fuel injection timing based on said engine operating condition indicative signal and generating a basal fuel injection timing indicative signal indicative of said basal fuel injection timing determined;

means for determining whether said engine operating condition falls in a predetermined operating range based on said engine operating condition indicative signal, said predetermined operating range defined such that 1) an engine speed is between a first predetermined low engine speed and a second predetermined low engine speed and 2) an engine load is less than a predetermined low engine load;

means for correcting said basal fuel injection timing when said engine operating condition falls in said predetermined operating range and generating a fuel injection timing correcting signal indicative of said fuel injection timing corrected; and means for effecting a fuel injection to the engine based on said fuel injection timing correcting signal.

3. A method of treating exhaust particulates in a diesel engine, the method comprising the steps of:

detecting an engine operating condition and generating an engine operating condition indicative signal indicative of said engine operating condition detected;

setting a fuel injection amount based on said engine operating condition indicative signal;

determining a basal fuel injection timing based on said engine operating condition indicative signal and generating a basal fuel injection timing indicative signal indicative of said basal fuel injection timing determined;

determining whether said engine operating condition falls in a predetermined operating range based on said engine operating condition indicative signal, said predetermined operating range defined such that 1) an engine speed is between a first predetermined low engine speed and a second predetermined low engine speed and 2) an engine load is less than a predetermined low engine load;

correcting said basal fuel injection timing when said engine operating condition falls in said predetermined operating range and generating a fuel injection timing correcting signal indicative of said fuel injection timing corrected; and effecting a fuel injection to the engine based on said fuel injection timing correcting signal.

4. A diesel engine according to claim 1, wherein said first predetermined low engine speed is greater than an engine idling speed.

5. A diesel engine according to claim 4, wherein said second predetermined low engine speed is greater than said first predetermined low engine speed.

6. An apparatus according to claim 2, wherein said first predetermined low engine speed is greater than an engine idling speed.

7. A diesel engine according to claim 6, wherein said second predetermined low engine speed is greater than said first predetermined low engine speed.

8. A method according to claim 3, wherein said first predetermined low engine speed is greater than an engine idling speed.

9. A diesel engine according to claim 8, wherein said second predetermined low engine speed is greater than said first predetermined low engine speed.

* * * * *